United States Patent
Kunishima

(10) Patent No.: US 7,158,192 B2
(45) Date of Patent: Jan. 2, 2007

(54) TELEVISION TUNER IN WHICH INFLUENCE FROM ANALOG SIGNALS IS SUPPRESSED WHEN RECEIVING DIGITAL SIGNALS

(75) Inventor: Tsutomu Kunishima, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 552 days.

(21) Appl. No.: 10/617,087

(22) Filed: Jul. 10, 2003

(65) Prior Publication Data
US 2004/0012723 A1 Jan. 22, 2004

(30) Foreign Application Priority Data
Jul. 16, 2002 (JP) ............... 2002-206954

(51) Int. Cl.
*H04N 5/50* (2006.01)
(52) U.S. Cl. ............... 348/737; 348/731; 455/245.1
(58) Field of Classification Search ............... 348/725, 348/726, 728, 735, 737, 731; 455/245.1, 455/189.1, 245.2, 234.1; 375/345
See application file for complete search history.

(56) References Cited

U.S. PATENT DOCUMENTS

| | | | |
|---|---|---|---|
| 5,940,143 A * | 8/1999 | Igarashi et al. ............ 348/678 |
| 5,950,112 A | 9/1999 | Hori et al. | |
| 6,118,499 A * | 9/2000 | Fang ............ 348/726 |
| 6,307,599 B1 | 10/2001 | Komatsu | |
| 6,831,705 B1 * | 12/2004 | Yamamoto ............ 348/731 |
| 2002/0021371 A1 | 2/2002 | Konishi et al. | |
| 2002/0060751 A1 | 5/2002 | Rowe et al. | |

FOREIGN PATENT DOCUMENTS

| | | |
|---|---|---|
| EP | 0 667 712 | 8/1995 |
| EP | 1 331 811 | 7/2003 |
| GB | 2 004 428 | 3/1979 |
| JP | 2001-136447 | 5/2001 |

* cited by examiner

*Primary Examiner*—Michael H. Lee
(74) *Attorney, Agent, or Firm*—Brinks Hofer Gilson & Lione

(57) ABSTRACT

A high frequency amplifier for amplifying inputted television signals; a mixer for subjecting the television signals which have been amplified to frequency conversion into intermediate frequency signals; a SAW filter for selecting, out of the intermediate frequency signals, intra-range intermediate frequency signals emerging in a range within a prescribed intermediate frequency band; and an intermediate frequency amplifier for amplifying the intra-range intermediate frequency signals are provided, and wide band detecting means for detecting the intermediate frequency signals inputted to the SAW filter and generating a first AGC voltage is provided to control a gain of the high frequency amplifier with the first AGC voltage.

3 Claims, 3 Drawing Sheets

_US 7,158,192 B2_

TELEVISION TUNER IN WHICH INFLUENCE FROM ANALOG SIGNALS IS SUPPRESSED WHEN RECEIVING DIGITAL SIGNALS

BACKGROUND OF THE INVENTION

1. Field of the Invention

The present invention relates to a television tuner, and more particularly to a television tuner suitable for use in television receivers for receiving analog television broadcasts or digital television broadcasts.

2. Description of the Prior Art

A television tuner according to the prior art will be described with reference to FIG. 5. Analog television signals and digital television signals are inputted to an input tuning circuit 31. The tuning frequency of the input tuning circuit 31 is so controlled as to be tuned to television signals on the channel to be received, but the tuning characteristic is relatively loose because it is configured of a single-tuned circuit. At the stage immediately following the input tuning circuit 31 is connected a high frequency amplifier 32. The high frequency amplifier 32 is made up of a variable gain amplifier, whose gain can be varied with an AGC voltage that is applied. At the stage immediately following the high frequency amplifier 32 is connected an inter-stage tuning circuit 33. Although the inter-stage tuning circuit 33, too, is so controlled as to be tuned to television signals on the channel to be received, the tuning characteristic is sharper than that of the input tuning circuit 31 because it is configured of a double-tuned circuit. At the stage immediately following the inter-stage tuning circuit 33 is connected a mixer 34. The mixer 34 is supplied with local oscillation signals from an oscillator 35.

In the configuration described above, whereas the inputted television signals undergo frequency conversion into intermediate frequency signals by the mixer 34, only the television signals of the channel to be received are converted into a frequency range in a prescribed intermediate frequency band. Whereas other television signals than those of the channel to be received are converted outside the range in the prescribed intermediate frequency band, the level of intermediate frequency signals deriving from them is lower than that of intermediate frequency signals in the range because they attenuate according to the tuning characteristics of the input tuning circuit 31 and the inter-stage tuning circuit 33.

At the stage immediately following the mixer 34 is connected a first intermediate frequency amplifier 36, and at the stage immediately following the first intermediate frequency amplifier 36 is connected a SAW filter 37. At the stage immediately following the SAW filter 37 is connected a second intermediate frequency amplifier 38.

At the stage immediately following the SAW filter 37 is also connected detecting means 39, and at the stage immediately following it is connected an operational amplifier 40. The output end of the operational amplifier 40 is connected to the gain control end of the high frequency amplifier 32.

In the foregoing configuration, the SAW filter 37 has a sharp characteristic to pass almost only the intermediate frequency band and to attenuate all other ranges to a considerably low level. Therefore, out of the intermediate frequency signals outputted from the SAW filter 37, the level of intermediate frequency signals outside the pertinent range in the intermediate frequency band is far lower than that of intermediate frequency signals within that range. The detecting means 39 detects intermediate frequency signals in the range and outputs them as an AGC voltage. The AGC voltage, after being converted to a prescribed level by the operational amplifier 40, is supplied to the high frequency amplifier 32. Therefore, intermediate frequency signals within the range corresponding to the television signals of the channel to be received are outputted at a substantially constant level from the second intermediate frequency amplifier 38. The outputted intermediate frequency signals are demodulated by a demodulator (not shown) for analog or digital signals provided at a subsequent stage.

Incidentally, whereas digital television signals are transmitted over some other channel than the channel for conventional analog television signals, their level may become 35 dB to 45 dB lower than that of the analog television signals as shown in FIG. 6. When signals transmitted over a channel for digital television signals in such a state are received, even if analog television signals of a great field strength are present on a nearby channel, the level of intermediate frequency signals outside the pertinent range based on the analog television signals outputted from the SAW filter will be lower than that of intermediate frequency signals within the range based on the digital television signals. Therefore, no AGC operation would take place on the basis of the intermediate frequency signals outside the range.

Accordingly, at a stage where the level of television signals of the channel to be received requires no AGC operation, analog television signals amplified to the maximum by the high frequency amplifier are inputted to the mixer to generate a heavy distortion in the mixer. There may arise a further problem that, if the high frequency amplifier is saturated by being oscillated in a large amplitude, gain compression will occur to make it impossible to sufficiently amplify the digital television signals to be received.

This problem can be solved by so setting as to start the AGC operation at a stage where the level of the television signals to be inputted is still low, but there would arise a new problem that the S/N ratio of intermediate frequency signals of the channel to be received deteriorates.

SUMMARY OF THE INVENTION

An object of the present invention is to restrain, when receiving digital television signals in a state where analog television signals of a great field strength are present on a nearby channel, such as an immediate next channel or a second next channel, distortions from occurring in the high frequency amplifier or the mixer.

To achieve the object stated above, according to the invention, there are provided a high frequency amplifier for amplifying inputted television signals; a mixer for subjecting the television signals which have been amplified to frequency conversion into intermediate frequency signals; a SAW filter for selecting, out of the intermediate frequency signals, intra-range intermediate frequency signals emerging in a range within a prescribed intermediate frequency band; and an intermediate frequency amplifier for amplifying the intra-range intermediate frequency signals, and wide band detecting means for detecting the intermediate frequency signals inputted to the SAW filter and generating a first AGC voltage is further provided to control a gain of the high frequency amplifier with the first AGC voltage.

The input end of the SAW filter is grounded via a series resonant circuit, and a resonance frequency of the series resonant circuit is set to a frequency of extra-range intermediate frequency signals emerging outside the range in the intermediate frequency band out of the intermediate frequency signals inputted to the SAW filter.

Also, there is provided narrow band detecting means for detecting the extra-range intermediate frequency signals emerging outside the intermediate frequency band out of the intermediate frequency signals inputted to the SAW filter and generating a second AGC voltage, wherein the narrow band detecting means have a series resonant circuit resonating with the extra-range intermediate frequency signals and a detector connected in series to the series resonant circuit, the gain of the high frequency amplifier is controlled with the second AGC voltage, and the second AGC voltage is variable relative to the first AGC voltage.

Further, a plurality of the narrow band detecting means are provided.

DETAILED DESCRIPTION OF THE PREFERRED EMBODIMENT

Figure 1:
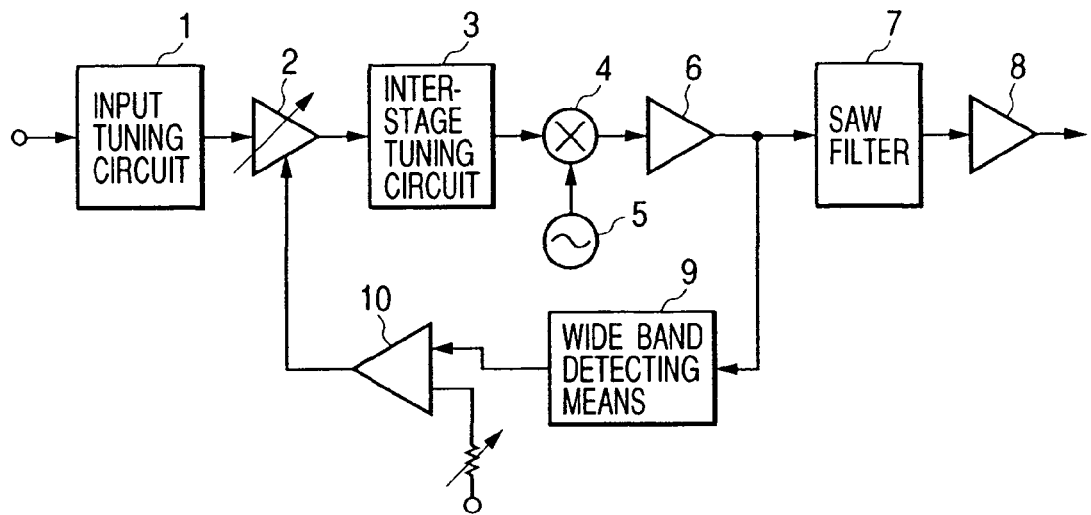
FIG. 1 is a circuit diagram showing a basic configuration of a television tuner according to the present invention.
Figure 2:
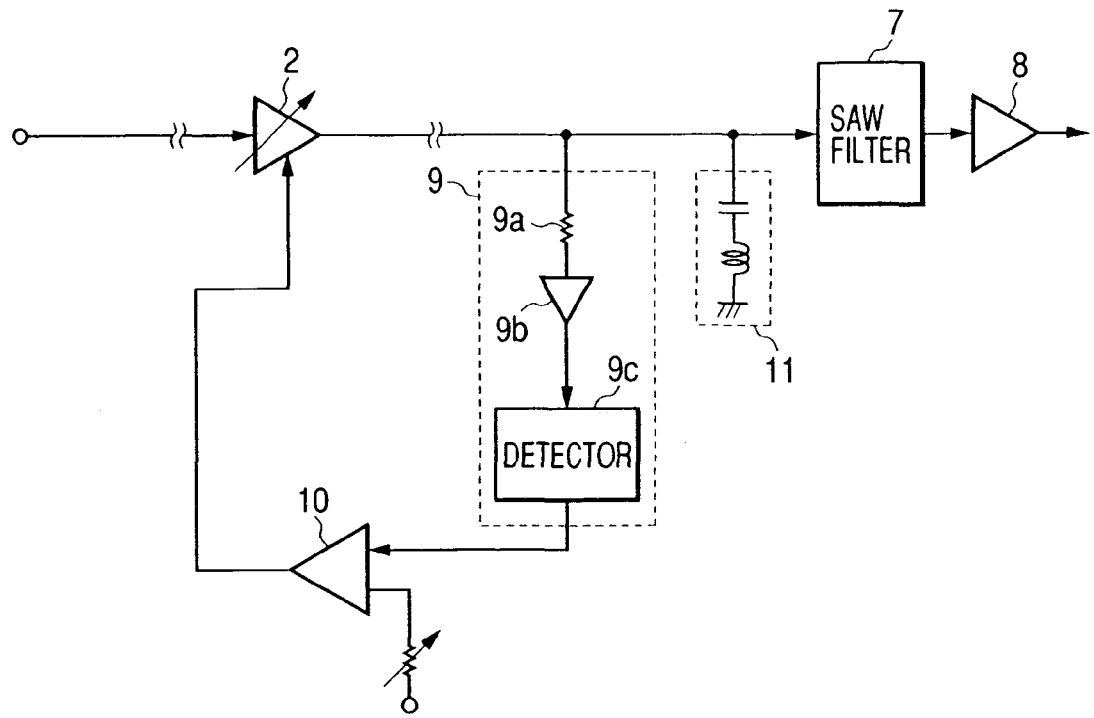
FIG. 2 is a circuit diagram showing another basic configuration of a television tuner according to the invention.

A television tuner according to the present invention will be described with reference to FIG. 1 through FIG. 4. FIG. 1 shows a basic configuration; FIG. 2, another configuration; and FIG. 4, still another configuration.

Referring first to FIG. 1, analog television signals and digital television signals are inputted to an input tuning circuit 1. Whereas the tuning frequency of the input tuning circuit 1 is controlled to tune the circuit to television signals of the channel to be received, the tuning characteristic is relatively loose because it is configured of a single-tuned circuit. At the next stage to the input tuning circuit 1 is connected a high frequency amplifier 2. The high frequency amplifier 2 is configured of a variable gain amplifier, and its gain is variable with the AGC voltage that is applied. At the next stage to the high frequency amplifier 2 is connected an inter-stage tuning circuit 3. Although the inter-stage tuning circuit 3 is also controlled to be tuned to television signals of the channel to be received, its tuning characteristic is sharper than that of the input tuning circuit 1 because it is configured of a double-tuned circuit.

At the next stage to the inter-stage tuning circuit 3 is connected a mixer 4. To the mixer 4 are supplied local oscillation signals from an oscillator 5. The local oscillation frequency is controlled by a PLL circuit (not shown) together with the tuning frequencies of the input tuning circuit 1 and the inter-stage tuning circuit 3.

In the configuration described above, the inputted television signals undergo frequency conversion by the mixer 4 into intermediate frequency signals, but only the intermediate frequency signals among television signals of the channel to be received emerge in a range in a prescribed intermediate frequency band (hereinafter the intermediate frequency signals emerging in that range will be referred to as intra-range intermediate frequency signals). When other television signals than those of the channel to be received undergo frequency conversion, the resultant intermediate frequency signals emerge outside the pertinent range of the intermediate frequency band (hereinafter the intermediate frequency signals emerging outside that range will be referred to as extra-range intermediate frequency signals). Since other television signals than those of the channel to be received attenuate according to the tuning characteristics of the input tuning circuit 1 and the inter-stage tuning circuit 3, the level of extra-range intermediate frequency signals becomes lower than that of intra-range intermediate frequency signals.

At the next stage to the mixer 4 is connected a first intermediate frequency amplifier 6, and at the next stage to the first intermediate frequency amplifier 6 is connected a SAW filter 7. Since the SAW filter 7 has an intermediate frequency band as its pass band and steeply attenuates the ranges above and below it, the level of extra-range intermediate frequency signals outputted from the SAW filter 7 attenuates considerably more than that of intra-range intermediate frequency signals. At the next stage to the SAW filter 7 is connected a second intermediate frequency amplifier 8. From the second intermediate frequency amplifier 8 are outputted intra-range intermediate frequency signals at a substantially constant level. The outputted intra-range intermediate frequency signals are demodulated by an analog or digital demodulator (not shown) provided at the stage next to the second intermediate frequency amplifier 8.

Further, at the next stage to the first intermediate frequency amplifier 6 is connected wide band detecting means 9 having no frequency selecting function. Thus, the wide band detecting means 9 is connected to the input end side of the SAW filter 7. At the next stage to the wide band detecting means 9 is connected an operational amplifier 10. The output end of the operational amplifier 10 is connected to the gain control end of the high frequency amplifier 2.

To the wide band detecting means 9 are inputted the intermediate frequency signals (i.e. intra-range intermediate frequency signals and extra-range intermediate frequency signals) as they are which are inputted to the SAW filter 7. If the intra-range intermediate frequency signals are based on digital television signals and the extra-range intermediate frequency signals are based on analog television signals, it will be highly probable for the level of the extra-range intermediate frequency signals to be higher than that of the intra-range intermediate frequency signals. Therefore, with the tuning characteristics of the input tuning circuit 1 and the inter-stage tuning circuit 3 also taken into account, the difference between the level of the digital television signals and that of the analog television signals inputted to the high frequency amplifier 2 will be greater than the level difference between the two kinds of intermediate frequency signals.

In such a case, the wide band detecting means 9 detects the extra-range intermediate frequency signals of the higher level to output a first AGC voltage. Control is so performed as to attenuate the gain of the high frequency amplifier 2 with the first AGC voltage. Since the television signals (both digital television signals and analog television signals) outputted from the high frequency amplifier 2 are therefore inputted to the mixer 4 at a suppressed level, the generation of distortions in the mixer 4 is reduced.

If the first AGC voltage from the wide band detecting means 9 is lowered, the effect of distortion improvement in the mixer 4 and others is reduced because the start of attenuation of the gain of the high frequency amplifier 2 is delayed (the gain attenuation starts when the level of inputted television signals becomes higher), or if that voltage is raised to advance the start of attenuation, the gain attenuation will start when the level of television signals is still low, and accordingly the S/N ratio of the intermediate frequency signals (intra-range intermediate frequency signals) deriving from digital television signals to be received will deteriorate; therefore, the level of the AGC voltage at the time when the high frequency amplifier 2 starts attenuating the gain is set according to the level relationship between digital television signals and analog television signals.

Although the generation of distortions in the mixer 4 can be suppressed in the configuration shown in FIG. 1, if the level of extra-range intermediate frequency signals deriving from analog television signals is too high, they will pass the SAW filter 7 and be inputted to the second intermediate frequency amplifier 8. Then, new distortions will arise in the second intermediate frequency amplifier 8. In view of this problem, as shown in FIG. 2, a series resonant circuit 11 is inserted between the input end of the SAW filter 7 and the ground, and its resonance frequency is set to be identical with one of the frequencies of extra-range intermediate frequency signals (more specifically, video intermediate frequency signals), the number of extra-range intermediate frequency signals inputted to the second intermediate frequency amplifier 8 will decrease, and accordingly the generation of distortions will be reduced.

Figure 3:
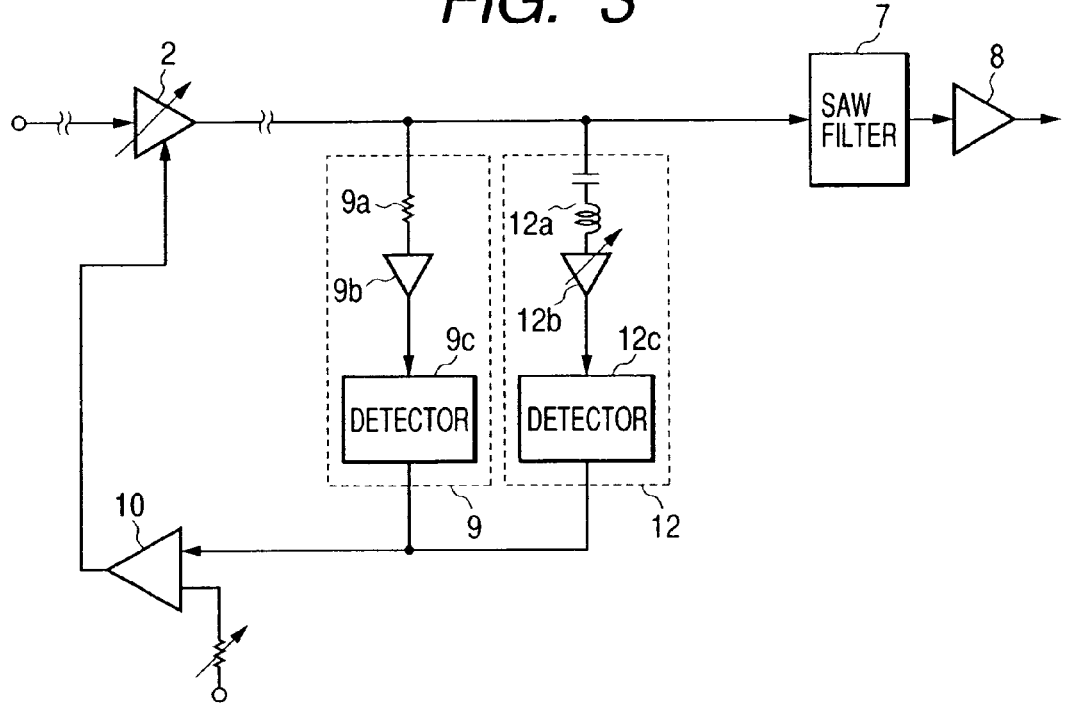
FIG. 3 is a circuit diagram showing still another basic configuration of a television tuner according to the invention.

According to the configuration shown in FIG. 3, a second AGC voltage is generated in response to extra-range intermediate frequency signals, thereby to prevent the S/N ratio of intra-range intermediate frequency signals based on the channel to be received from deteriorating and to reduce the generation of distortions in the mixer 4, and distortions in the second intermediate frequency amplifier 8 by extra-range intermediate frequency signals are also reduced.

The wide band detecting means 9 shown in FIG. 3 is configured by connecting in series a resistor 9a, an amplifier 9b and a detector 9c. First narrow band detecting means 12 is provided in parallel with the wide band detecting means 9. The first narrow band detecting means 12 is configured by connecting in series a series resonant circuit 12a, a variable gain amplifier 12b and a detector 12c. The resonance frequency of the series resonant circuit 12a is set to be equal to the frequency of extra-range intermediate frequency signals.

The wide band detecting means 9 detects the intermediate frequency signals of the highest level whether they are intra-range intermediate frequency signals or extra-range intermediate frequency signals, and outputs the first AGC voltage. The first narrow band detecting means 12 detects extra-range intermediate frequency signals which resonate with the series resonant circuit 12a and outputs the second AGC voltage. Therefore, the wide band detecting means 9 is insensitive to the extra-range intermediate frequency signals detected by the first narrow band detecting means 12.

In the foregoing configuration, as the gain setting by the variable gain amplifier 12b of the first narrow band detecting means 12 enables the second AGC voltage to be varied relative to the first AGC voltage, if for instance the gain of the high frequency amplifier 2 is attenuated by the second AGC voltage and the S/N ratio of intra-range intermediate frequency signals is feared to deteriorate, this S/N ratio deterioration can be averted by keeping the second AGC voltage low and thereby delaying the start of gain attenuation of the high frequency amplifier 2. Or if heavy distortions are likely to be invited in the mixer 4 by television signals of any other channel than the channel to be received, the start of gain attenuation of the high frequency amplifier 2 can be delayed by increasing the second AGC voltage. Further, as the level of extra-range intermediate frequency signals is also attenuated by the series resonant circuit 12a, the generation of distortions in the second intermediate frequency amplifier 8 is also reduced.

Figure 4:
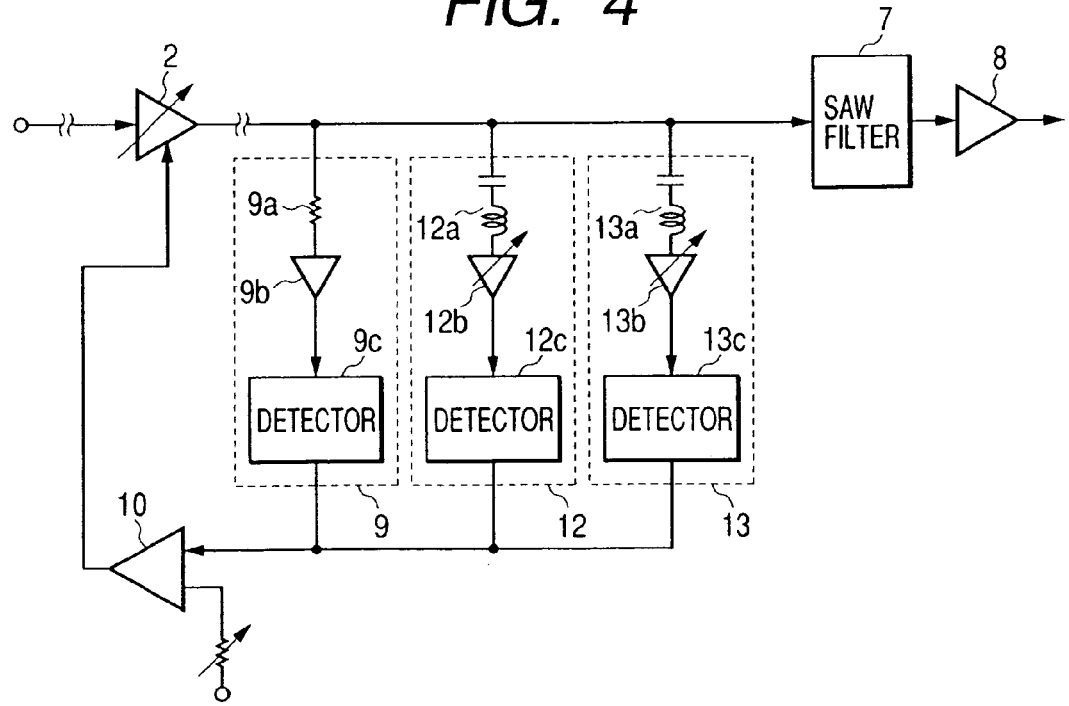
FIG. 4 is a circuit diagram showing yet another basic configuration of a television tuner according to the invention.
Figure 5:
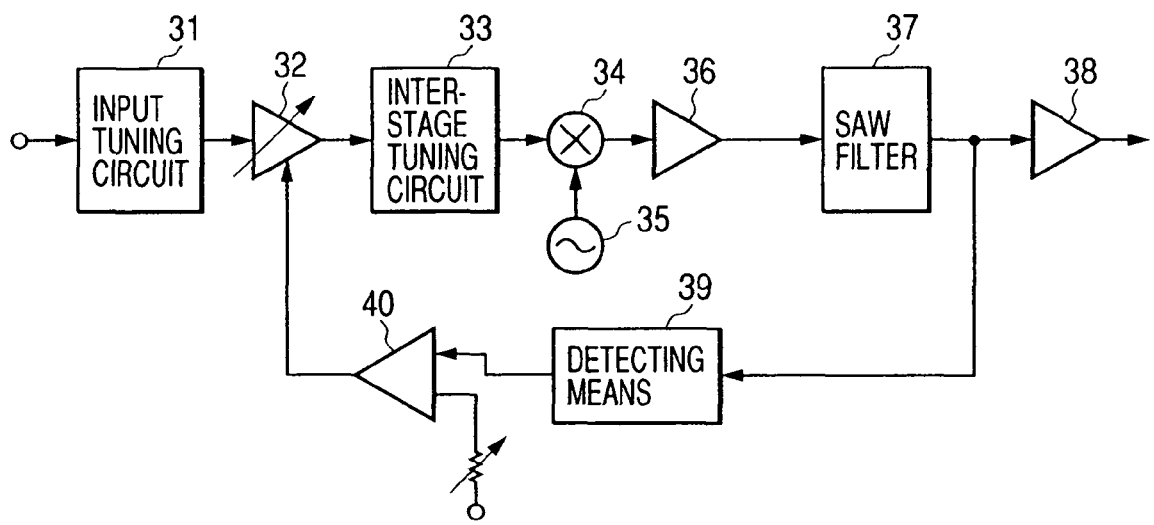
FIG. 5 is a circuit diagram showing a configuration of a television tuner according to the prior art.
Figure 6:
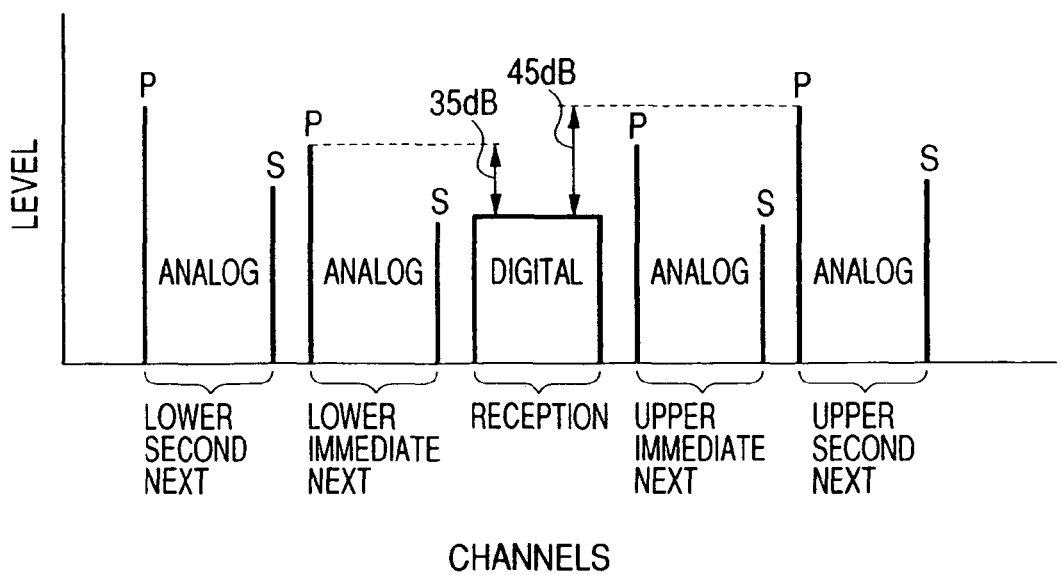
FIG. 6 is a diagram of level comparison among different types of television signals.

FIG. 4 shows a configuration in which second narrow band detecting means 13 is additionally provided in parallel with the wide band detecting means 9. The second narrow band detecting means 13 also has a series resonant circuit 13a, a variable gain amplifier 13b and a detector 13c, and the series resonant circuit 13a is caused to resonate with other extra-range intermediate frequency signals. Therefore, the configuration of FIG. 4 makes it possible to detect a plurality of extra-range intermediate frequency signal sequences and generate the second AGC voltage.

In the configuration shown in FIG. 4, the series resonant circuits 12a and 13a are respectively caused to resonate with two sequences of extra-range intermediate frequency signals. By appropriately setting the levels of their respective variable gain amplifiers 12b and 13b, the S/N ratio deterioration of intra-range intermediate frequency signals and the generation of distortions in the mixer 4 can be prevented.

As hitherto described, there are provided a mixer for subjecting television signals to frequency conversion into intermediate frequency signals; a SAW filter for selecting, out of the intermediate frequency signals, intra-range intermediate frequency signals emerging in a range within a prescribed intermediate frequency band; and an intermediate frequency amplifier for amplifying the intra-range intermediate frequency signals, and wide band detecting means for detecting the intermediate frequency signals inputted to the SAW filter and generating a first AGC voltage is further provided to control the gain of the high frequency amplifier with the first AGC voltage, with the result that, as the levels of the television signals (both digital television signals and analog television signals) outputted from the high frequency amplifier are suppressed and the signals are inputted to the mixer at the suppressed levels, the generation of distortions in the mixer is reduced.

Also, the input end of the SAW filter is grounded via a series resonant circuit, and the resonance frequency of the series resonant circuit is set to the frequency of extra-range intermediate frequency signals emerging outside the range in the intermediate frequency band out of the intermediate frequency signals inputted to the SAW filter, therefore the number of extra-range intermediate frequency signal sequences inputted to the intermediate frequency amplifier decreases, resulting in reduced generation of distortions.

Further, there is provided narrow band detecting means for detecting extra-range intermediate frequency signals emerging outside the intermediate frequency band out of the intermediate frequency signals inputted to the SAW filter and generating a second AGC voltage, wherein the narrow band detecting means has a series resonant circuit resonating with the extra-range intermediate frequency signals and a detector connected in series to the series resonant circuit, the gain of the high frequency amplifier is controlled with the second AGC voltage, and the second AGC voltage is variable relative to the first AGC voltage, therefore if the S/N ratio of intra-range intermediate frequency signals is feared to deteriorate when the gain of the high frequency amplifier is attenuated by the second AGC voltage, this S/N ratio deterioration can be averted by keeping the second AGC voltage low and thereby delaying the start of gain attenuation of the high frequency amplifier. Or if heavy distortions are likely to be invited in the mixer by television signals of any other channel than the channel to be received, the start of gain attenuation of the high frequency amplifier can be delayed by increasing the second AGC voltage. Further, as the level of extra-range intermediate frequency signals is also attenuated by the series resonant circuit, the generation of distortions in the second intermediate frequency amplifier is also reduced.

Also, as a plurality of narrow band detecting means are provided, it is possible to prevent the S/N ratio deterioration of intra-range intermediate frequency signals and the generation of distortions in the mixer by causing the series resonant circuits of the respective narrow band detecting means to resonate with the plurality of sequences of extra-range intermediate frequency signals.

What is claimed is:

1. A television tuner provided with a high frequency amplifier for amplifying inputted television signals; a mixer for subjecting the television signals which have been amplified to frequency conversion into intermediate frequency signals; a SAW filter for selecting, out of the intermediate frequency signals, intra-range intermediate frequency signals emerging in a range within a prescribed intermediate frequency band; and an intermediate frequency amplifier for amplifying the intra-range intermediate frequency signals, wherein wide band detecting means for detecting the intermediate frequency signals inputted to the SAW filter and generating a first AGC voltage is provided to control a gain of the high frequency amplifier with the first AGC voltage, wherein an input end of the SAW filter is grounded via a series resonant circuit, and wherein a resonance frequency of the series resonant circuit is set to a frequency of extra-range intermediate frequency signals emerging outside the range in the intermediate frequency band out of the intermediate frequency signals inputted to the SAW filter.

2. The television tuner according to claim 1, wherein there is provided narrow band detecting means for detecting the extra-range intermediate frequency signals emerging outside the intermediate frequency band out of the intermediate frequency signals inputted to the SAW filter and generating a second AGC voltage, wherein the narrow band detecting means have a series resonant circuit resonating with the extra-range intermediate frequency signals and a detector connected in series to the series resonant circuit of the narrow bad detecting means, wherein the gain of the high frequency amplifier is controlled with the second AGC voltage, and wherein the second AGC voltage is variable relative to the first AGC voltage.

3. The television tuner according to claim 2, wherein a plurality of the narrow band detecting means are provided.

* * * * *